Patented Nov. 15, 1949

2,488,216

UNITED STATES PATENT OFFICE 2,488,216

FLUOROCARBONS

Earl T. McBee, La Fayette, Vincent V. Lindgren, West Lafayette, Ind., and Waldo B. Ligett, Detroit, Mich., assignors to Purdue Research Foundation, West Lafayette, Ind., a corporation of Indiana No Drawing. Application June 10, 1946, Serial No. 675,822

4 Claims. (Cl. 260—651)

This invention relates to a novel group of organic compounds and more specifically to aromatic fluorocarbons containing at least seven carbon atoms. To our knowledge, this invention represents the first synthesis and isolation of aromatic fluorocarbons containing at least seven carbon atoms. Previous investigators have prepared compounds composed of only carbon and fluorine, but in no instance have such compounds contained at least seven carbon atoms including the aromatic structure.

The compounds in general are non-flammable liquids, boiling above the boiling point of water. Owing to their aromatic structure, together with the fact that they are composed solely of carbon and fluorine, the compounds are extremely stable. Because of their unique structure and stability, these fluorocarbons have many important applications. The compounds are useful as special solvents, heat transfer fluids, insulating materials in electrical equipment, such as transformer fluids, and in many other ways.

We have prepared representative members of the above-named group of compounds and have determined several of their physical constants whereby they may be identified. The preparation of aromatic fluorocarbons containing at least seven carbon atoms may be accomplished, for example, by the treatment of an appropriate halocarbon with a fluorinating agent, for example, bromine trifluoride, as the first step in the process. The organic fluorine-containing material from this reaction is then treated with antimony pentafluoride to replace, with fluorine, any bromine which may have entered the molecule during the reaction with bromine trifluoride. The product of the antimony pentafluoride reaction contains chlorine, fluorine, and usually only traces of bromine. Dehalogenation of this product is subsequently accomplished by means of a suitable dehalogenating agent, such as zinc dust in a liquid medium, to yield the perfluoroaromatic compound containing at least seven carbon atoms.

The following examples illustrate methods for the preparation of members of this new group of compounds but are in no way to be construed as limiting the invention thereto:

Example 1.—Perfluorotoluene, $C_6F_5CF_3$

Six hundred and forty-six grams of bromine trifluoride was placed in a nickel tube 5.2 centimeters in diameter and 50 centimeters in length, closed at one end and cooled to approximately 10 degrees centigrade. Pentachlorobenzotrifluoride was added thereto with continuous stirring by means of a motor-driven nickel rod, inserted through the open top of the nickel tube and fitted with four blades, two inches apart on the rod. After the first 100-gram and each of the following 200-gram quantities of pentachlorobenzotrifluoride had been added, the reactor was heated to 90 degrees centigrade, maintained at this temperature for a short time, e. g., ten to thirty minutes, and then cooled to approximately 10 degrees centigrade. When 500 grams of pentachlorobenzotrifluoride had been added to the reaction, the mixture was heated overnight at 150 degrees centigrade. The liquid product was cautiously washed with water to remove excess bromine trifluoride. The product was neutralized with dilute alkali, washed with water and separated, yielding 685 grams of a colorless liquid.

A second batch of 600 grams of pentachlorobenzotrifluoride was treated in a similar manner with bromine trifluoride. Eight hundred and one grams of bromine trifluoride was placed in a nickel tube and cooled to approximately 10 degrees centigrade. To this was added, in small quantities, 600 grams of pentachlorobenzotrifluoride. The rate of addition was, as usual, necessarily slow to prevent burning. The entire mixture was heated at 130 degrees centigrade for 36 hours. The product solidified in an ice bath and was washed with aqueous alkali and water, which was later removed by vacuum distillation.

The product from the above two reactions was combined in a three-neck flask fitted with stirrer, reflux condenser, and dropping funnel. One and one-half moles of antimony pentafluoride was added thereto at a temperature of 90 degrees centigrade over a three-hour period. The mixture was then heated to 140 degrees centigrade and maintained at this temperature for a period of several hours, during which time 125 grams of bromine was distilled therefrom. The organic product, after being washed with concentrated hydrochloric acid, weighed 1018 grams and was a mixture of average composition $C_6Cl_4F_7$—$CF_3$.

This halocarbon mixture was subjected to two treatments with zinc dust in ethanol. The first was with 535 grams of zinc dust suspended in 200 milliliters of ethanol at 90 degrees centigrade. The second was with 100 grams of zinc dust at 135 degrees centigrade. Five hundred and sixty-nine grams of dehalogenated product was obtained and rectified in a four-foot glass-packed column. The compounds which were separated by rectification included perfluorotoluene, having a boiling point of 103.5 degrees centigrade at 740 millimeters of mercury pressure absolute, a freezing point below −70 degrees centigrade, a refractive index at 20 degrees centigrade of 1.3664, and a density at 24 degrees centigrade of 1.66 grams per milliliter.

*Example 2.—Perfluoroxylene, $C_6F_4(CF_3)_2$*

As in Example 1, three hundred and fifty-two grams of tetrachlorobis(trifluoromethyl)benzene was placed in the nickel tube, dissolved in 200 grams of bromine and cooled to zero degree centigrade. Bromine trifluoride was added thereto in small quantities, and was stirred by the means previously described. Four hundred and eleven grams of bromine trifluoride was added over a period of three hours in a portionwise manner. The temperature was then raised to 90 degrees centigrade for nineteen hours, after which the excess bromine trifluoride which remained was destroyed with water. The product, after washing with dilute alkali and water, weighed 391 grams.

The product of the above reaction was added to a three-neck flask containing a refluxing suspension of 150 grams of zinc dust in 300 milliliters of ethanol. The addition consumed a period of eight hours, after which the organic product was removed from the reaction mixture by heating to 150 degrees centigrade. Higher boiling fractions were removed by introduction of superheated steam. The organic product, weighing 150 grams, was rectified in a four-foot Podbielniak column and yielded, among other products, perfluoroxylene, $C_8F_{10}$, corresponding closely in fluorine content to the theoretical of 66.4 per cent. Perfluoroxylene boiled at 120–121 degrees centigrade at atmospheric pressure.

*Example 3.—Perfluoronaphthalene, $C_{10}F_8$*

Five hundred grams of bromine was placed in the nickel tube used in the previous experiment and cooled to ice temperature. Four hundred grams of octachloronaphthalene was dissolved in the bromine and 595 grams of bromine trifluoride was added during 6 hours with continuous stirring.

The mixture was heated at 65 degrees centigrade to allow complete reaction to occur. More bromine trifluoride was added in successive batches of 100, 64 and 31 grams, with heating after each addition. The mixture was heated at 95 degrees centigrade until the last trace of bromine was removed. The liquid product weighed 531 grams.

The organic material from the reaction with bromine trifluoride was placed in a one-liter iron autoclave with 60 grams of antimony pentachloride and 150 grams of anhydrous hydrogen fluoride. The autoclave was rocked continuously and heated to a temperature of 180 degrees centigrade over a period of 7.5 hours, during which time the pressure rose to 1250 p. s. i. These conditions were maintained for an additional eleven hours. The autoclave was cooled, hydrogen chloride, hydrogen fluoride, and bromine bled therefrom, and the liquid product removed.

After being washed with hydrochloric acid, the 329 grams of product which remained were dissolved in ethanol.

The above solution was subjected to a dehalogenation with 325 grams of zinc dust suspended in ethanol. The mixture was maintained at reflux for 24 hours, whereafter the temperature was raised slowly to 140 degrees centigrade while the ethanol and volatile products distilled from the reaction mixture. The remaining volatile products were removed by steam distillation. Higher boiling material was not removed and only 83 grams of liquid product was separated. After washing with dilute alkali and water the product was rectified to yield, among other compounds, octafluoronaphthalene, boiling at about 80 degrees centigrade at 15 millimeters of mercury pressure absolute and containing 55.0 per cent fluorine compared with the theoretical percentage of fluorine for octafluoronaphthalene of 55.8

*Example 4.—Perfluorobiphenyl, $C_{12}F_{10}$*

Bromine trifluoride was reacted with decachlorobiphenyl in the above-described nickel tube using a mole ratio of six $BrF_3$ to one decachlorobiphenyl. As this chlorocarbon reacted less vigorously, more rapid addition was possible. After 200 grams of decachlorobiphenyl had been added at ice temperature, the mixture was too viscous to permit stirring. The remainder of the one mole of organic material was consequently added at or above 50 degrees centigrade with vigorous stirring. The final mixture was heated overnight at 160 degrees centigrade and yielded an organic product which was, after pulverization in air, a grey-white solid weighing 594 grams and having an average composition of $C_{12}BrCl_8F_{13}$.

This product was treated with 87 grams of antimony pentafluoride in a three-neck flask fitted with stirrer, reflux condenser, and dropping funnel. The antimony pentafluoride was added over a period of two hours to the organic reactant at 90 degrees centigrade, and the resulting mixture was heated to 150 degrees centigrade, at which temperature most of the bromine distilled from the reaction mixture. After being washed three times with hydrochloric acid to remove antimony salts, the organic compound solidified at room temperature. This solid was dissolved in an ether solution for final washing and drying. At this point the organic solid was a mixture of average composition $C_{12}Cl_3F_{14}$.

The ether solution, containing about 500 grams of biphenyl derivatives, was added slowly to a stirred mixture of 309 grams of zinc dust, 300 grams of acetamide, 100 grams of anhydrous sodium carbonate and 10 grams of sodium iodide at 120 degrees centigrade. After addition of the halocarbon solution was complete, the mixture was heated at 150 degrees centigrade for two hours. The organic products were extracted from the residue with ten portions of ether, the ether removed, and the product steam-distilled as a method of purification. From this mixture of reaction products may be isolated perfluorobiphenyl.

Other perfluoroaromatic compounds containing at least seven carbon atoms may be prepared in a manner analogous to that given above for the preparation of perfluorotoluene, perfluoroxylene, perfluoronaphthalene and perfluorobiphenyl.

In the following claims, "fluorocarbon" is used to denote a compound composed solely of carbon and fluorine atoms.

We claim:

1. An aromatic fluorocarbon containing from seven to twelve carbon atoms, inclusive.

2. Perfluorotoluene, $C_6F_5CF_3$.
3. Perfluoroxylene, $C_6F_4(CF_3)_2$.
4. Perfluoronaphthalene, $C_{10}F_8$.

EARL T. McBEE.
    VINCENT V. LINDGREN.
    WALDO B. LIGETT.

REFERENCES CITED

The following references are of record in the file of this patent:

UNITED STATES PATENTS

| Number | Name | Date |
| --- | --- | --- |
| 2,013,035 | Daudt et al. | Sept. 3, 1935 |
| 2,063,979 | Booth | Dec. 15, 1936 |
| 2,121,330 | Scherer et al. | June 21, 1938 |

OTHER REFERENCES

Ruoff, "Ber. deutsch. chem. Gesell.," vol. 9, pp. 1486, 1487, 1491 (1876).

Schiemann et al., "Ber. deutsch. chem. Gesell.," vol. 62, p. 1808 (1929).